United States Patent [19]
Griffith

[11] 3,930,549
[45] Jan. 6, 1976

[54] PROTECTIVE GUARD ASSEMBLY FOR TRACK DRIVE MOTORS

[75] Inventor: Bobby D. Griffith, Aurora, Ill.

[73] Assignee: Caterpillar Tractor Co., Peoria, Ill.

[22] Filed: Nov. 15, 1974

[21] Appl. No.: 524,075

[52] U.S. Cl............................. 180/9.48; 180/89 R
[51] Int. Cl.² ......................................... B62D 55/00
[58] Field of Search......... 180/9.48, 6.48, 89 R, 6.2, 180/6.7, 9.2; 305/10, 60

[56] References Cited
UNITED STATES PATENTS
| | | | |
|---|---|---|---|
| 2,833,361 | 5/1958 | Schwartz | 180/6.48 |
| 3,712,398 | 1/1973 | Althaus | 180/9.48 |
| 3,797,598 | 3/1974 | Wanner | 180/89 R |

*Primary Examiner*—Philip Goodman
*Attorney, Agent, or Firm*—Phillips, Moore, Weissenberger Lempio & Strabala

[57] ABSTRACT

A track-type vehicle comprises a pair of laterally spaced track assemblies adjustably mounted on a frame of the vehicle for movement between maximum and minimum gauge widths thereof. A guard assembly is mounted on the frame to fully cover and protect the motors when the track assemblies are positioned at each such gauge width. The guard assembly is preferably attached to the frame by three laterally spaced pin connections which further function to transmit towing forces to the frame directly.

18 Claims, 7 Drawing Figures

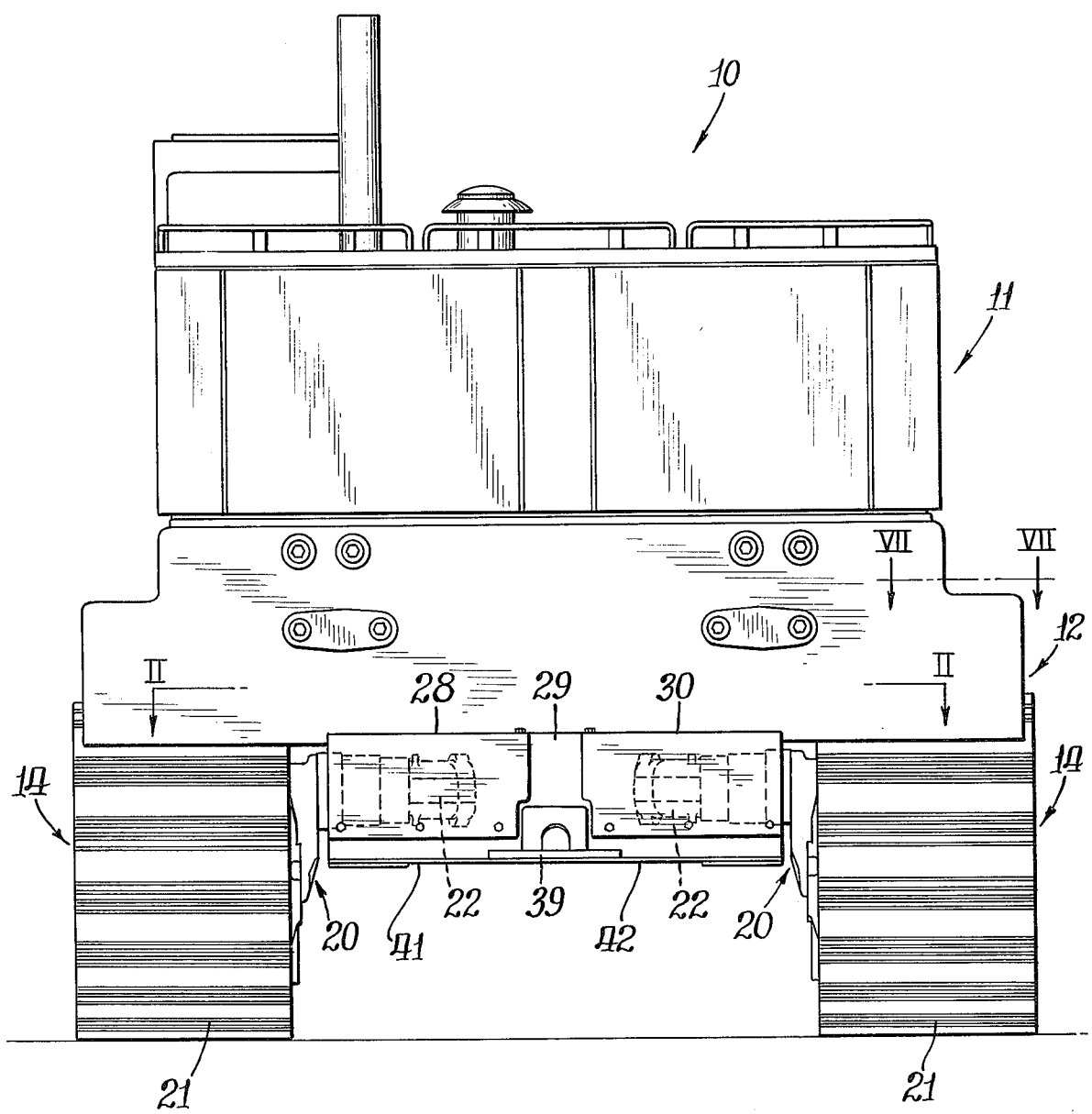

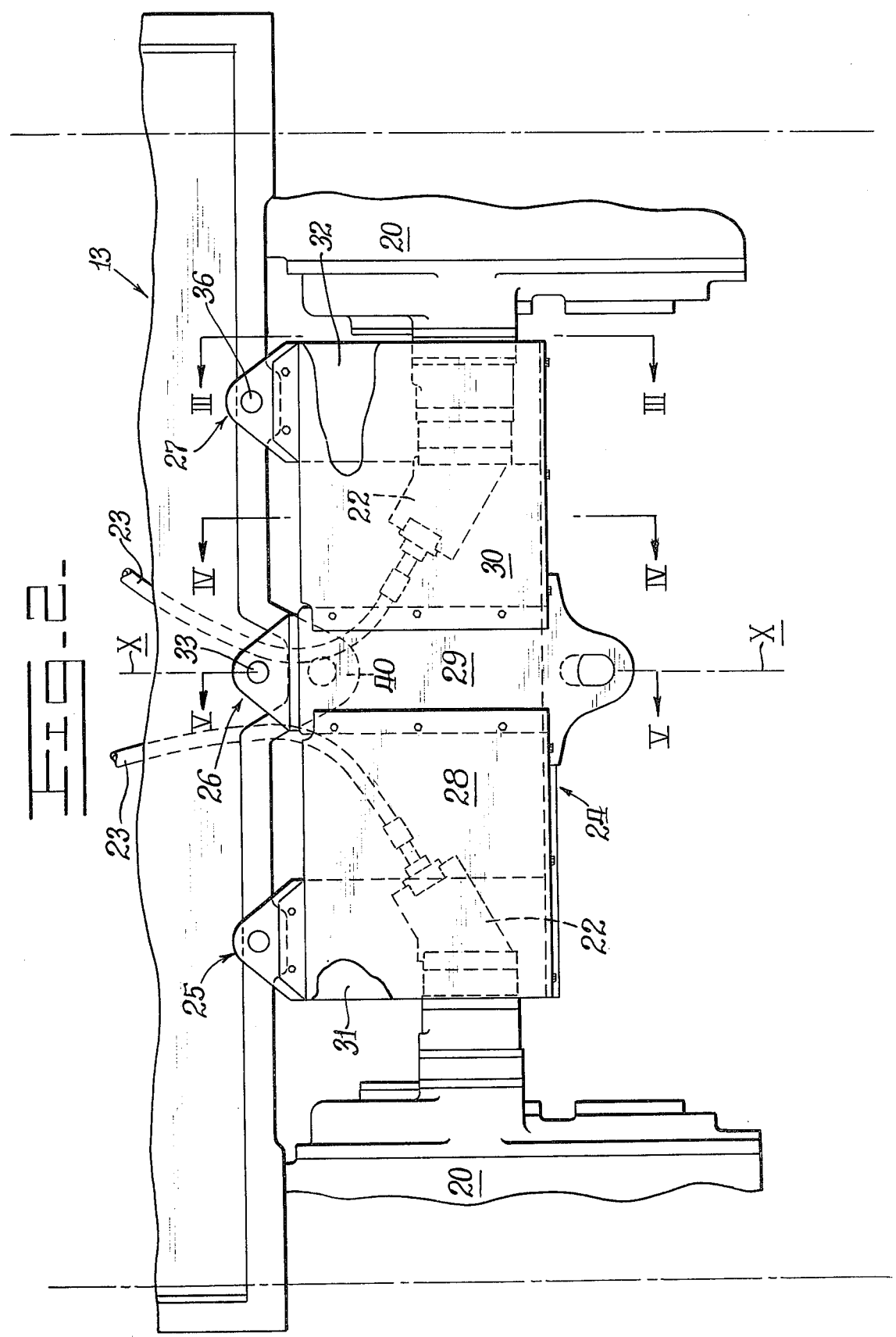

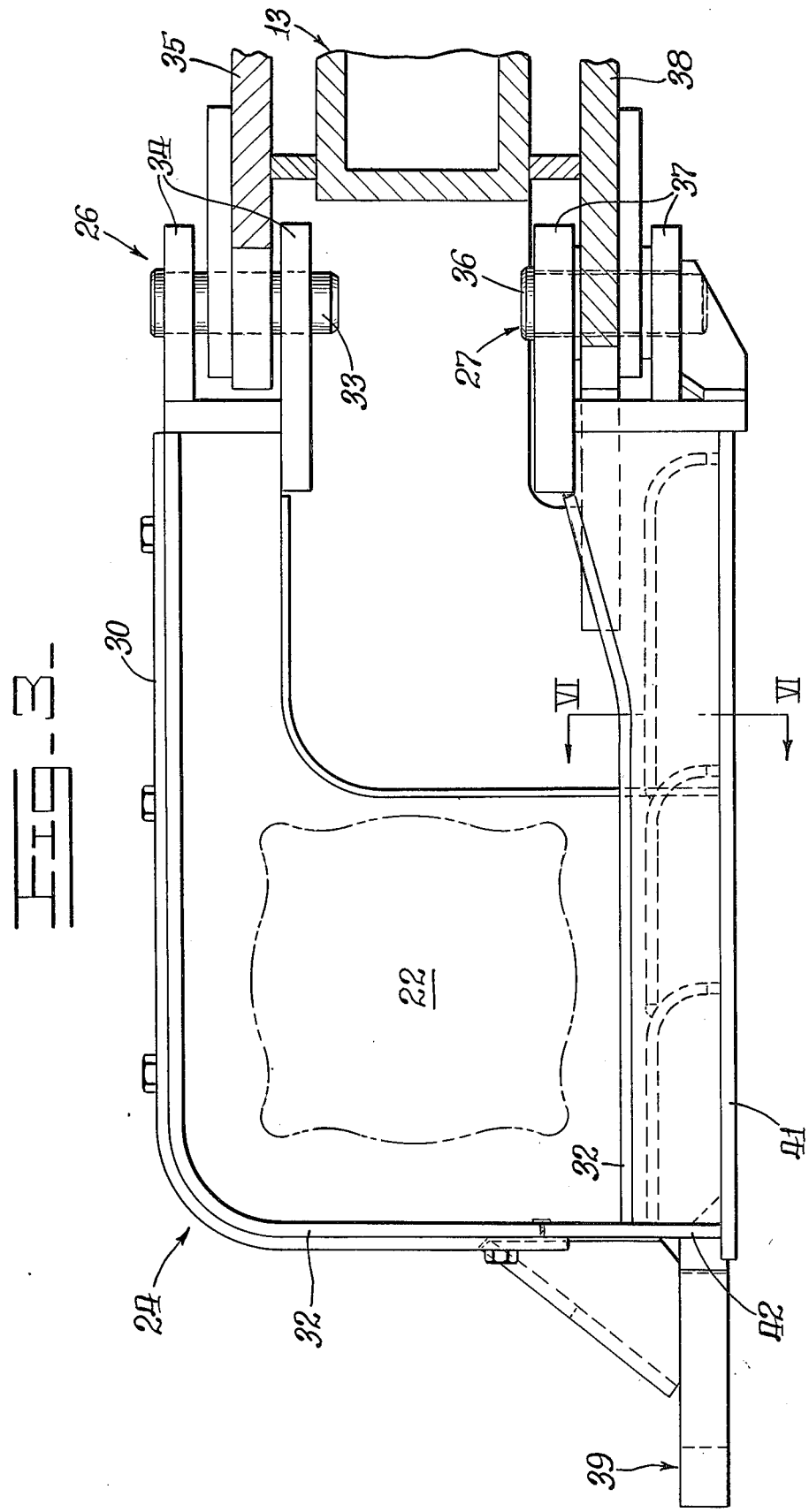

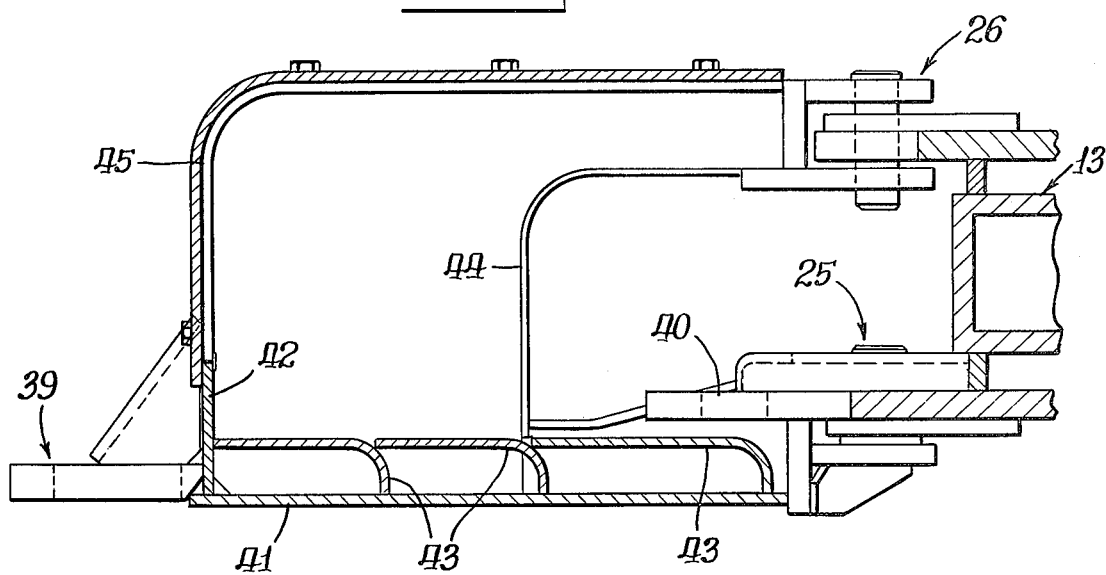
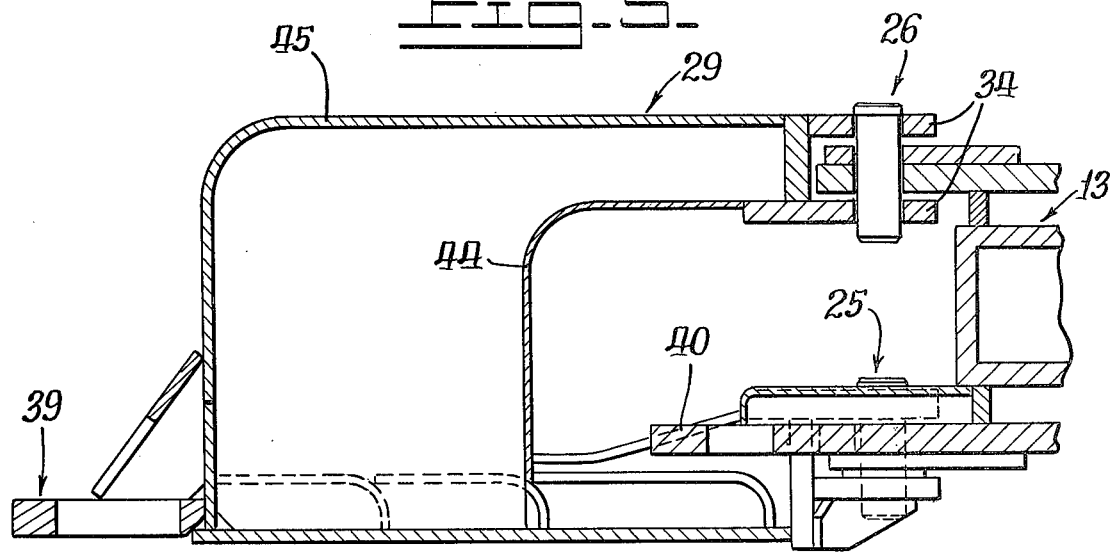

PROTECTIVE GUARD ASSEMBLY FOR TRACK DRIVE MOTORS

BACKGROUND OF THE INVENTION

Hydraulically powered track-type vehicles, such as hydraulic excavators, comprise a pair of track assemblies each driven by a separate drive motor. Each drive motor is secured to a respective track roller frame to extend inboard thereof and conduits are connected to the drive motors to selectively communicate hydraulic operating fluid thereto. U.S. Pat. No. 3,797,598, assigned to the assignee of this application, discloses a guard assembly for protecting the drive motors and conduits against any potential damage by their impact with rocks, stumps or the like.

Such a guard assembly must be dismantled when the vehicle is transported to a remote job site, requiring a narrowing of the gauge width between the track assemblies for transportation purposes. In particular, a hydraulic excavator normally requires a substantial gauge width to increase its overall stability during earthworking operations and a narrower gauge width, as dictated by various governmental regulations, when such transportation occurs. Such requirements are enumerated in U.S. Patent application Ser. No. 474,976 for "Gauge Width Adjustment Means for Track-Type Vehicles," filed on May 31, 1974 by Bobby D. Griffith and assigned to the assignee of this application.

SUMMARY OF THIS INVENTION

An object of this invention is to provide a tracktype vehicle with an improved guard assembly for fully protecting drive motors, drivingly connected to laterally spaced track assemblies thereof, when the track assemblies are at both their maximum and minimum gauge widths. Each drive motor is mounted on a sub-frame of a respective track assembly and the guard assembly is detachably mounted on a main frame of the vehicle to at least substantially enclose the motors. In the preferred embodiment of this invention, the guard assembly is detachably connected to the main frame by a plurality of pin connections which further function to transmit towing forces to the main frame directly.

BRIEF DESCRIPTION OF THE DRAWINGS

Other objects of this invention will become apparent from the following description and accompanying drawings wherein:

FIG. 1 is a rear elevational view of a hydraulic excavator having a protective guard assembly of this invention attached thereon to substantially enclose and protect a pair of drive motors and attendant structures;

FIG. 2 is an enlarged top plan view of the guard assembly and protected motors, taken in the direction of arrows II—II in FIG. 1;

FIGS. 3–5 are enlarged cross sectional views through the guard assembly, taken in the direction of arrows III—III, IV—IV and V—V, respectively, in FIG. 2;

DETAILED DESCRIPTION

Figure 6:
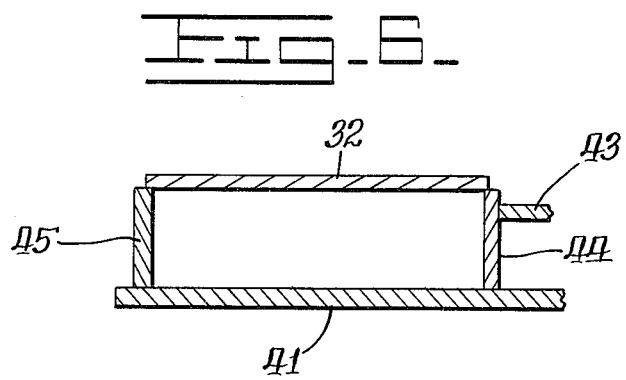
FIG. 6 is a sectional view of a portion of the guard assembly, taken in the direction of arrows VI—VI in FIG. 3.

FIG. 1 illustrates a back side of a hydraulic excavator 10 comprising an upper unit 11 rotatably mounted on a car body or undercarriage 12 in a conventional manner. The car body comprises a main frame 13 (FIGS. 2 and 3) having a pair of laterally spaced and substantially parallel endless track assemblies 14 disposed on either side thereof. The main frame is attached to each of the track assemblies by adjustment means, such as the type disclosed in above-referenced U.S. Patent application Ser. No. 474,976.

Figure 7:
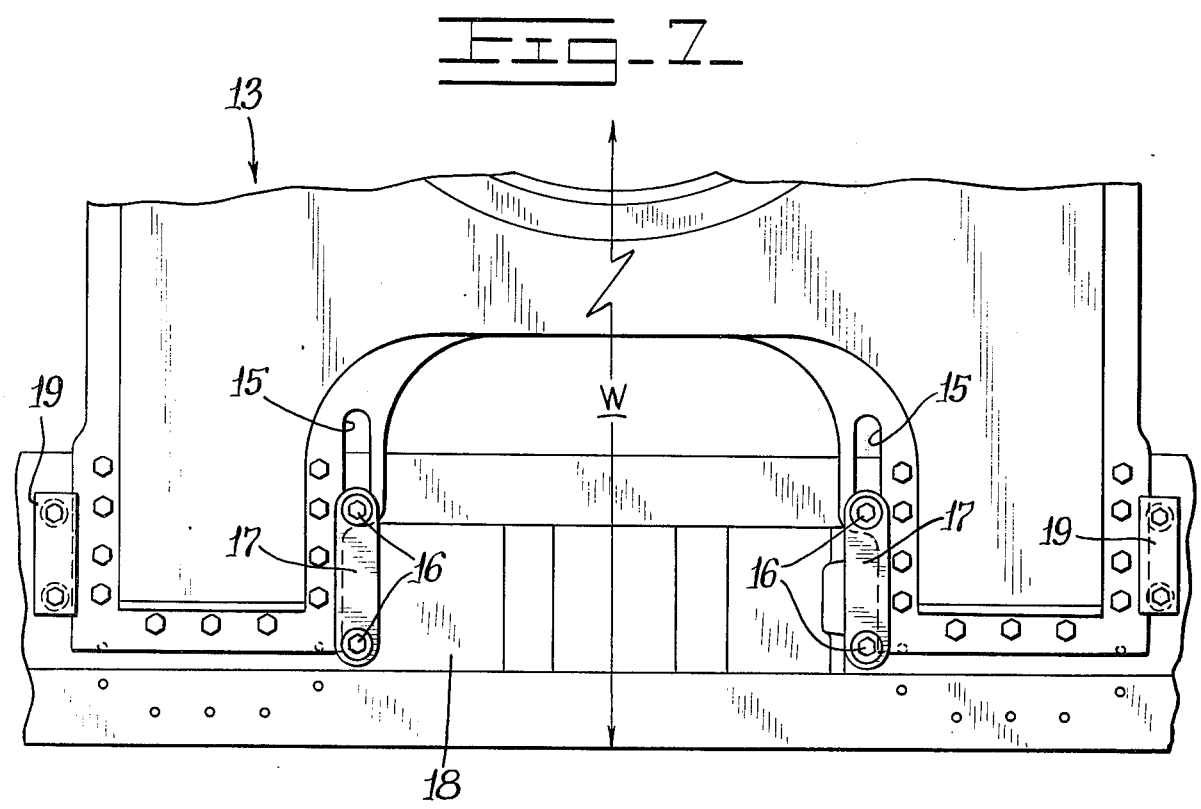
FIG. 7 is a partial top plan view of a gauge width adjustment means for the excavator, taken generally in the direction of arrows VII—VII in FIG. 1.

FIG. 7 illustrates each such an adjustment means as comprising a pair of elongated slots 15 formed through a lateral extension of main frame 13, and cap screws 16 attaching a pair of plates 17 and the main frame to an underlying track roller or sub-frame 18 of a respective track assembly. A pair of second parallel plates 19 are also attached to the sub-frame and cooperate with plates 17 to guide the track roller frame during the selective changing of gauge width W between its illustrated maximum setting and a narrowed minimum setting. Although it is preferred to have such an adjustment means operatively connected between main frame 13 and each of the track assemblies, it should be understood that such adjustment means could be employed to connect the main frame to only one of the track assemblies, depending on the degree of adjustment required.

Referring to FIGS. 1–3, a final drive assembly 20 is attached to each track roller or sub-frame 18 by means, not shown, and is adapted to drive an endless track 21 of the track assembly in a conventional manner. The power input to final drive assembly comprises a standard reversible hydraulic motor 22 operatively connected thereto and to conduit means comprising a pair of conduits 23 (one shown) for selectively communicating pressurized hydraulic fluid to the motor via a conventional operator control means (not shown). As will be hereinafter more fully understood, a protective guard assembly 24 is connected to main frame 13 to at least substantially enclose motors 22 and portions of the conduits when the track assemblies are positioned at each of their maximum and minimum gauge widths.

The guard assembly is detachably mounted on the main frame by three laterally spaced releasable pin connections 25, 26, and 27. As shown in FIG. 2, the guard assembly comprises three upper cover members 28, 29 and 30 and a pair of lower cover plates 31 and 32, all suitably integrated in a manner hereinafter described to form a unitary structure. Since the guard assembly is substantially symmetrical on each side of a longitudinal axis X of the vehicle (FIG. 2), only one side of the guard assembly and attendant structures will be described in detail hereinafter.

Referring to FIG. 3, centrally disposed pin connection 26 is disposed vertically above outboard pin connections 25 and 27 and comprises a vertically disposed pin 33 extending through a bifurcated bracket 34 formed centrally on the guard assembly and mounted on a rearwardly extending upper plate 35, forming an integral part of main frame 13. Pin connection 27, for example, comprises a vertically disposed pin 36 extending through a bifurcated bracket 37 which is mounted by the pin on a lower plate 38, also forming an integral part of the main frame. Pull hooks 39 and 40 are secured at a rearward, lower end of the guard assembly and plate 28, respectively, to provide tow-line attachment means adapted for towing other vehicles.

During such towing with pull hook 39, it should be noted that towing forces are transmitted through pin connections 25, 26 and 27 to main frame 13 directly. In addition, the staggered three point pin connection will afford multi-directional stability to guard assembly 24 during such towing. Pull hook 40 may be utilized when the guard assembly is removed from the vehicle.

As best shown in FIGS. 3 and 4, the guard assembly further comprises a horizontally disposed heavy duty lower plate 41 disposed therebelow to extend the full lateral width thereof. The rearward end of the plate is welded to an upstanding plate 42, also extending the full lateral width of the guard assembly. Plate 32 forms an integrated structure underlying a respective drive motor 22, along with a plurality of curved reinforcing plates 43 and vertically disposed plates 44 and 45 (FIG. 6), when the drive motor is disposed at its operating position dictated by the widest gauge width between the track roller frames.

The forward ends of plates 32 and 41 are welded to bracket 37, as shown in FIG. 3. Intermediate cover member 29 comprises a pair of curved plates 44 and 45 welded to bracket 34 (FIG. 5). The lower ends of plates 44 and 45 are welded to plates 41 and 42, respectively.

FIG. 2 illustrates the relative positions of drive motors 22 when the rightward endless track assembly is disposed at its extreme inboard position, relative to main frame 13, and the leftward track assembly is disposed at its extreme outboard position relative thereto. It can be seen that guard assembly 24 functions to at least substantially enclose the drive motors when the track assemblies are positioned at each of their maximum and minimum gauge widths. In particular, the left hand motor is shown at an outboard position occurring during vehicle operation whereas the right hand drive motor is shown at an inboard position for narrowing the gauge width during shipping of the vehicle.

I claim:

1. A track-type vehicle disposed for movement along a longitudinal axis thereof comprising
   a main frame,
   a pair of laterally spaced and parallel track assemblies, each comprising a sub-frame and an endless track entrained therearound, mounted on said main frame and separated laterally at a predetermined maximum gauge width,
   adjustment means operatively connected between said main frame and at least one of said sub-frames for permitting selective narrowing of said maximum gauge width to a minimum gauge width,
   laterally spaced drive motors each mounted on a respective sub-frame and operatively connected to a respective one of said tracks, and
   a guard assembly detachably mounted on said main frame to at least substantially enclose said motors when said track assemblies are positioned at each of their maximum and minimum gauge widths said guard assembly comprising a plurality of upper cover members overlying said motors and a horizontally disposed lower plate underlying said drive motors and secured to said upper cover members.

2. The vehicle of claim 1 further comprising conduit means operatively connected to each of said drive motors for communicating operating fluid thereto and having portions thereof at least substantially enclosed by said guard assembly.

3. The vehicle of claim 1 wherein said guard assembly is detachably mounted on said main frame by a plurality of releasable pin connections.

4. The vehicle of claim 3 wherein three laterally spaced pin connections detachably mount said guard assembly on said main frame.

5. The vehicle of claim 4 wherein a centrally disposed one of said pin connections is positioned vertically above an outboard pair of said pin connections.

6. The vehicle of claim 3 wherein each of said pin connections comprise a bifurcated bracket secured on said guard assembly and detachably mounted on a respective plate of said main frame by a vertically disposed pin extending through each bracket and a respective plate.

7. The vehicle of claim 1 wherein said lower plate extends to full lateral width of said guard assembly.

8. The vehicle of claim 7 further comprising a plurality of reinforcing plates secured on said lower plate to underlie each of said motors.

9. The vehicle of claim 1 further comprising a pull hook secured on a rearward end of said guard assembly.

10. The vehicle of claim 9 further comprising a second pull hook secured on a rearward end of said main frame.

11. A unitary guard assembly detachably mounted on a frame of a vehicle by a three laterally spaced releasable pin connections, said guard assembly comprising a plurality of upper cover members and a horizontally disposed lower plate and a rearward plate each extending the full lateral width of said guard assembly and each secured to said upper cover members.

12. The guard assembly of claim 11 further comprising a plurality of reinforcing plates secured on said lower plate on each outboard side thereof.

13. The guard assembly of claim 11 further comprising a pull hook secured on a rearward end of said guard assembly.

14. The guard assembly of claim 13 further comprising a second pull hook secured on a rearward end of said frame.

15. The guard assembly of claim 11 wherein a centrally disposed one of said pin connections is positioned vertically above an outboard pair of said pin connections.

16. The guard assembly of claim 11 wherein each of said pin connections comprises a bifurcated bracket secured on said guard assembly and detachably mounted on a respective plate of said frame by a vertically disposed pin extending through each bracket and a respective plate.

17. A unitary guard assembly detachably mounted on a frame of a vehicle by a plurality of releasable pin connections, said guard assembly comprising a plurality of upper cover members and a horizontally disposed lower plate and a rearward plate each extending the full lateral width of said guard assembly and each secured to said upper cover member, a first pull hook secured on a rearward end of said guard assembly and a second pull hook secured on a rearward end of said frame.

18. A unitary guard assembly detachably mounted on a frame of a vehicle by a plurality of releasable pin connections, said guard assembly comprising a plurality of upper cover members and a horizontally disposed lower plate and a rearward plate each extending the full lateral width of said guard assembly and each secured to said upper cover members and wherein each of said pin connections comprises a bifurcated bracket secured on said guard assembly and detachably mounted on a respective plate of said frame by a vertically disposed pin extending through each bracket and a respective plate.

* * * * *